F. J. TROLL.
LOAD INDICATOR.
APPLICATION FILED JAN. 8, 1917.
1,329,685.
Patented Feb. 3, 1920.
2 SHEETS—SHEET 2.
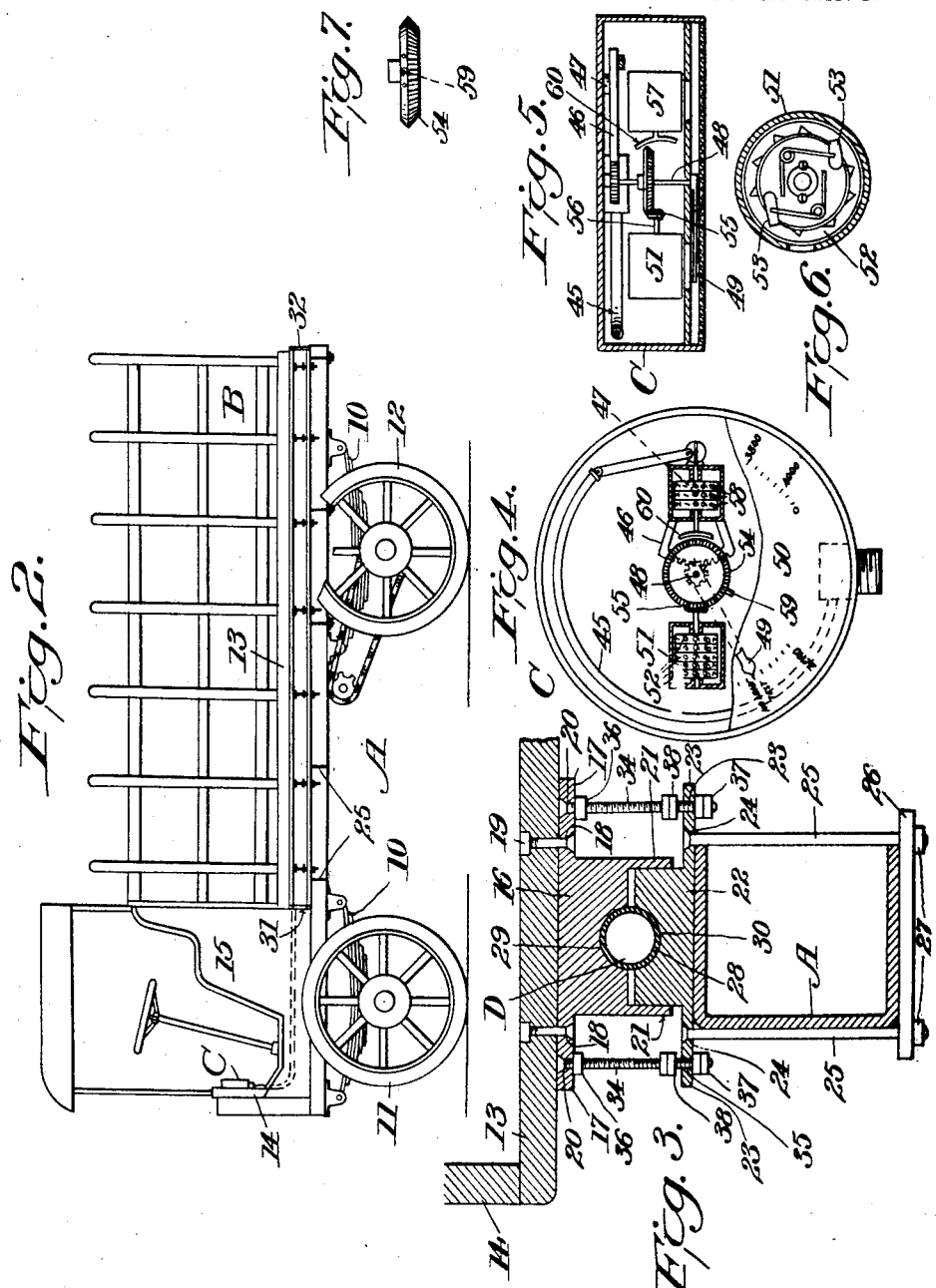

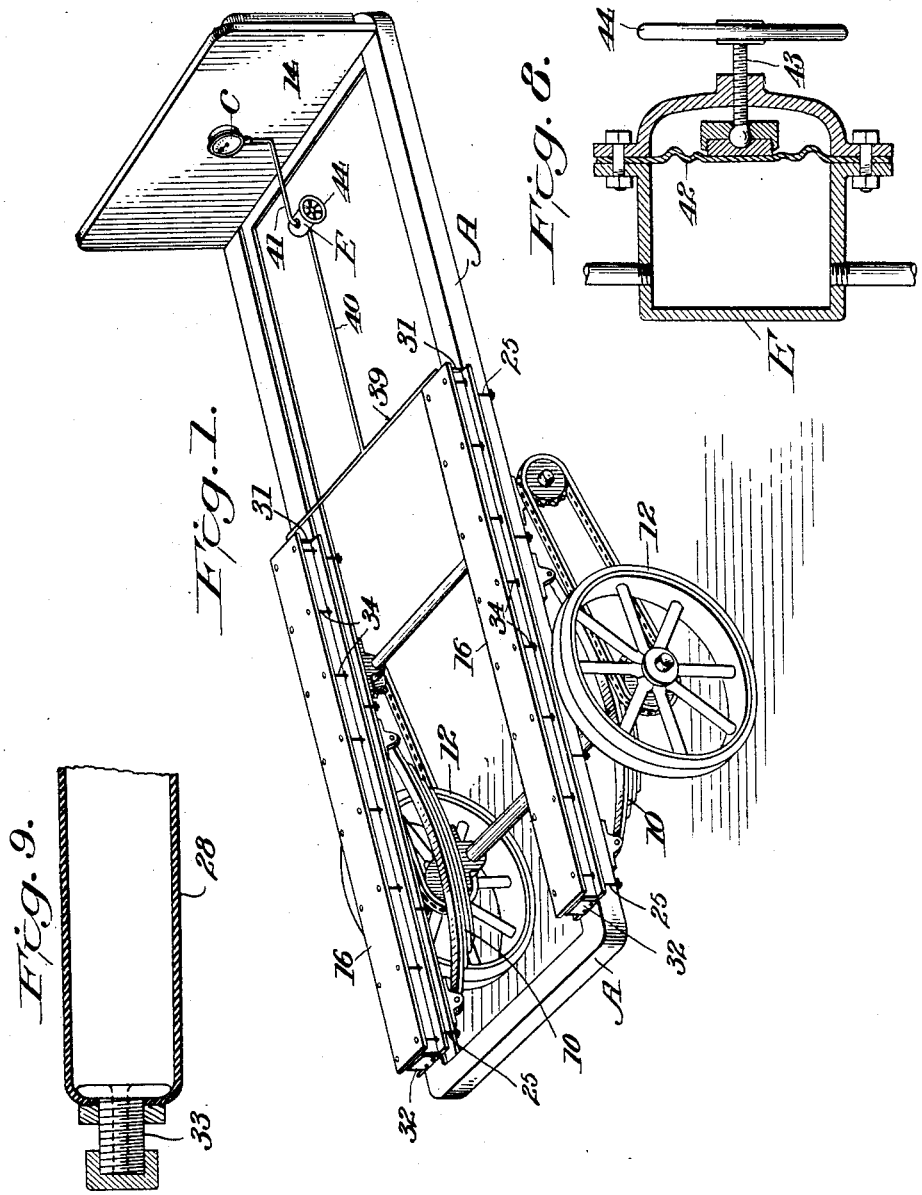

UNITED STATES PATENT OFFICE.

FREDERICK J. TROLL, OF BALTIMORE, MARYLAND, ASSIGNOR TO THE LOADOMETER COMPANY, OF BALTIMORE, MARYLAND, A CORPORATION OF DELAWARE.

LOAD-INDICATOR.

1,329,685.

Specification of Letters Patent.

Patented Feb. 3, 1920.

Application filed January 8, 1917. Serial No. 141,221.

*To all whom it may concern:*

Be it known that I, FREDERICK J. TROLL, a citizen of the United States, residing at Baltimore, and State of Maryland, have invented certain new and useful Improvements in Load-Indicators, of which the following is a specification.

This invention relates to load indicators.

Motor trucks are sometimes equipped with a sign disposed at some convenient point on the truck to indicate the pound capacity thereof. Sometimes warnings are located on the truck to the effect that the truck should not be loaded to an extent beyond the rated carrying capacity, say for instance, three thousand pounds. The reason for such notices and warnings is that the overloads place the truck under unnecessary strain and impair the life of the trucks. A cautious driver, in some instances, in his efforts to exercise extreme care may underload the vehicle or truck, thereby reducing the operative efficiency by increasing the unit cost per pound of the materials handled. Careless drivers are likely to overload a truck thereby increasing the repair cost, tire expense, etc., with the result that from the manufacturer's viewpoint, the reputation of the truck is affected to the disadvantage of the manufacturer.

In my application filed December 14, 1914, Serial No. 877,226, I have disclosed one embodiment of invention particularly adapted for application to motor trucks to indicate overloads and underloads in units of two hundred pounds, more or less, so that the rated capacity of the truck will not be abused or the operating efficiency reduced.

In my aforesaid application, I disclose a structure embodying an upper load carrying member and a lower member between which is arranged a fluid containing, operating compressible, load supporting member adapted to operate the load indicating means and constructed to yieldably support the load or the body when minus a load and which supporting member assumes its normal condition when relieved of pressure and thereby supports the body in normal position in the absence of fluid therein.

In the present application, the invention embraces the same general characteristics of the invention disclosed in the aforesaid application, and in both instances, the results and general objects are the same, but in the present instance, I aim to obtain the same results in a slightly different way. For instance, in the former application, the compressible supporting member has its walls so constructed that the member itself tends to assume its normal shape in cross section when the body is relieved of all load and also while said member is under the action of pressure incident to loads on the body of the vehicle, whether or not fluid be present in said member and actually assuming its normal shape when the body is relieved of pressure. In the present instance, the fluid containing, compressible member is constructed whereby the fluid tends to maintain the compressible member in normal shape while subjected to the action of varying loads and the member itself assuming its original shape to support the body yieldably in normal position when the vehicle is entirely relieved of loads, the compressible member being thereby constructed so as to afford a resilient support for the unloaded body in the absence of fluid in said member and with the fluid therein, affording a yieldable support for the loads on the body.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:

Figure 1 is a perspective view of the invention illustrating a portion of a vehicle showing the application of one embodiment of my invention thereto.

Fig. 2 is a side elevation of a vehicle illustrating the invention applied thereto.

Fig. 3 is a fragmentary transverse sectional view through one side of the vehicle illustrating a portion of my invention in section.

Fig. 4 is an elevation of gage with a part of the dial broken away.

Fig. 5 is a horizontal sectional view through the gage.

Fig. 6 is a transverse sectional view through one of the registering mechanisms illustrating one means for preventing backward movement of the registering disks.

Fig. 7 is a detail of the driving gear of the gage illustrating the means for adjustably positioning the trip arm.

Fig. 8 is a detail sectional view of the diaphragm chamber.

Fig. 9 is a detail longitudinal sectional view of the outer end of one of the compressible members.

Referring now more particularly to the accompanying drawings, the invention, generally, is illustrated as comprising a chassis A, a body B on which is carried a fluid pressure load indicating means C operated by one or more fluid containing, compressible means D operatively connected up with the indicating means to operate the latter and record the various loads placed on the body, there being disposed in the system a means E designed to maintain at all times an initial pressure on the system.

To the ends, just alluded to, the chassis A is shown as supported by springs 10 on front and rear wheels 11 and 12, respectively, and the body is provided with a bottom 13, a dash 14, and a driver's seat 15.

Oppositely disposed upper sills 16 are secured adjacent opposite sides of the under side of the bottom 13. These sills extend preferably from the rear of the driver's seat to the rear end of the chassis but they may be of any suitable length and may be disposed other than longitudinally of the truck. Each of these upper sills has longitudinal flanges 17 provided with apertures 18 through which bolts or other suitable fastenings 19 may be passed to secure the upper sills to the bottom 13 of the body. These flanges 17 are provided with other apertures 20 for a purpose presently explained.

Each sill 16 has downwardly depending longitudinal flanges 21 designed to slidably overlap the sides of coöperating lower sills 22 secured in any suitable manner to the chassis frame A. These lower sills 22 are provided with laterally directed flanges 23 provided with apertures 24, which, as shown, aline with the apertures 18 in the flanges 17 of the upper sills 16.

Bolts 25 are passed through the apertures 24 in the flanges 23 and through plates 26, disposed against the under side of the chassis frame and on their lower screw threaded ends receive nuts 27 whereby the lower sills 22 are clamped or otherwise tightly held on the chassis frame against lateral or other displacement.

The upper and lower sills 16 and 22 of each pair of sills have movement one within the other and these sills are held yieldably in spaced relation to each other in various ways. In the embodiment of invention illustrated herein a fluid containing compressible member 28 constitutes the compressible means D and is disposed in recesses 29 and 30 formed in the inner faces of the sills 16 and 22, respectively, maintaining the sills normally yieldably spaced apart. The recesses shown are substantially semi-circular shaped in cross section and of suitable depth to embrace substantially one-half of the side walls of the compressible members 28 for the purpose of effectually seating, reinforcing, protecting, and preventing undue distortion of the compressible members when compressed under the action of loads placed on the vehicle or expansion by pressure in the compressible members. These recesses 29 and 30 may be of any desired formation in cross section according to the shape in cross section of the compressible members 28.

Plates 31 and 32 may be secured to the inner and outer ends respectively of the pairs of sills or formed as flanges with the upper sills 16 for the purpose of protecting the ends of the compressible members, and thereby, together with the flanges 21 of the upper sills 16, completely inclosing the compressible members.

Caps or plugs 33 are preferably located at the outer ends of the compressible members for the purpose of preventing the escape of fluid from the outer ends thereof.

The compressible members 28 may be composed of rubber or other compressible, yieldable or resilient material and are preferably hollow. The walls of the compressible members are relatively thin when compared with the thickness of the walls of the compressible members illustrated and described in my aforesaid application. These relatively thin walls are reinforced by the recesses 29 and 30 coöperating therewith, the recesses retaining the compressible members and limiting the expansion thereof when the compressible members are subjected to pressure incident to varying loads placed on the vehicle or by internal fluid pressure therein. While the walls of the compressible members are relatively thin, these members support the body yieldably on the vehicle in the absence of fluid, due to the fact that the sides of the members are held against normal lateral expansion by the seats or recesses in the sills, practically completely embracing the same. The fitting relation between the compressible members and the sills prevents collapsing of the compressible members under the weight of the body of the vehicle. Of course, the weight of the body and the strength of the material of which the compressible members are formed is taken into consideration in the construction of my appliance.

It will thus be seen that incident to uneven riding and consequent jolting of the truck or because of varying loads there is a relative movement of the sills 16 and 22. This play between the respective upper and lower sills is resisted by the compressible members 28 and the fluid therein under the action of varying loads and this resistance may be maintained by the compressible member 28 in the absence of fluid when the vehicle is unloaded, as stated. These compressible members may be constructed of any suitable material and the sills which are preferably of metal, may be constructed in any suitable manner.

The play between the sills and the consequent degree of compression of the compressible members may be adjusted to limit the expansion or compression of the compressible members. To these ends screw threaded bolts 34 may be passed through the aforesaid holes 20 in the flanges 17 of the sills 16 and through holes 35 in the aforesaid flanges 23 of the sills 22. These bolts 34 are preferably inserted in the holes 20 before the sills 16 are applied to the body and nuts 36 may be employed to hold the bolts 34 in tight connection with the flanges 17 and prevent them from in any way exerting force against the bottom of the body. Lock nuts 37 are secured to the bolts 34 and disposed against the under faces of the flanges 23 of the sills 22. Lock nuts 38 are secured to the bolts 34 above the flanges 23 and adjustable on the bolts 34 in spaced relation to the upper faces of the flanges 23 and are adapted to provide stops designed to contact with the upper faces of the flanges 23 upon compression of the compressible members 28 and thereby limit the degree of compression of the compressible members, thereby preventing undue wear on the compressible members. Of course, the opposing meeting faces of the sills 16 and 22 on opposite sides of the recesses 29 and 30 would limit the degree of compression of the compressible members but the adjusting means for limiting this compression may be made effective for limiting the degree of compression short of contact of the inner faces of the sills, which latter, moreover, may be constructed of a form wherein but one of the sills contained a recess.

A metallic pipe or other connection 39 connects the inner ends of the compressible members 28 and this pipe or tube 39 is connected by means of a suitable pipe or tube 40 with the aforesaid fluid regulating means E located preferably near the front of the chassis. This fluid controlling means has pipe or other connection 41 with the indicating means C of any suitable character, mounted on the dash 12 of the vehicle in sight of the driver of the truck. The fluid capacity of this fluid controlling chamber, if used, may be adjusted or varied, as desired, by means of a diaphragm 42 mounted therein and adjustable by a screw threaded or other stem 43 provided with a handle or other means 44 to facilitate adjustment of the diaphragm.

The indicating means C may be of the pressure gage type which is actuated by fluid of any suitable character under the influence of one or more fluid containing, compressible, operating members interposed between the body or other load carrying member and the chassis or any other suitable lower member, the fluid containing, operating member or members being compressible to varying degrees according to the loads placed on the body or other load carrying member, the operating member being so constructed and arranged as to assume its normal shape when the vehicle has been unloaded so as to yieldably support the body on the chassis in the absence of fluid therein and which, with the proper amount of fluid and fluid pressure therein, is capable of yieldably supporting the load to actuate the indicating means.

While the operating means for the indicating means is shown as located between the chassis and body, the same may be disposed in the form of a false or auxiliary bottom removably mounted on the bottom of the main body of the truck or other vehicle. This would seem so obvious as to not necessitate illustration.

To further describe the operation of the invention, it may be noted that with fluid in the compressible members, compression of the same, under the action of varying loads, causes the fluid to operate the Bourdon tube 45 in the gage C which effects actuation of the segmental gear 46 on its pivot 47, and when it swings, it causes the shaft 48 to rotate, and consequently shift the hand 49 over the dial face 50 of the gage C and thereby indicate on the dial face the total pounds or amount of load in units, as the load is placed on the truck. The dial of the gage gives the rated capacity, say for instance, 3,000 pounds, although it is preferably graduated to indicate a greater rate of pounds capacity, as shown. It also discloses a "zero" point and a "no load test point". The hand indicator 49 should always point to this "no load test point" when the truck is unloaded.

There is maintained at all times an initial pressure on the system, for should there be any leakage, the indicator hand would drop below the "no load test point" toward the "zero" point. Should there be an extra amount of pressure from some cause or other, the hand 49 would go above the "no load test point". The aforesaid regulating diaphragm chamber E, if used, is for the purpose of adjusting the hand indicator so as to maintain the indicator hand pointing directly to the "no load test point" when the truck is unloaded. If the truck has been loaded with 3,000 pounds, to be carried to a certain point and 1,000 pounds is removed from the truck, the indicator hand 49 will drop back to the 2,000 pound mark. If the truck is then sent to another place and it has 600 pounds on, the indicator hand will indicate 2,600 pounds. The additional 600 pounds and all loads put or taken on will be registered on a registering means 51, including rotatable disks 52, held against backward movement by pawls 53. The rotatable disks 52 are operated by a beveled gear 54 mounted on the aforesaid shaft 48 and meshing with the beveled gear 55 on the disk shaft 56. Should the truck be overloaded above a predetermined amount, say for instance, 1,000 pounds overload, it would cause the hand indicator 46 to indicate 4,000 pounds on the dial. This act of overloading will be registered on a register 57, including rotatable disks 52 held against backward movement by pawls, like the aforesaid pawls 53.

One way in which the times the truck has been overloaded may be indicated, is to provide the aforesaid beveled gear 55 with a projection or other tripping element 59 which is so disposed that when the gear 55 has been rotated to such an extent as to cause the indicator hand 49 to pass the predetermined amount of overload, as shown on dial 50, the trip 59 will engage the star wheel 60 and thereby cause actuation of the disks 58 of the register 61, indicating thereon the number of times the truck has been overloaded. Any suitable form of registering mechanisms 51 and 57 may be employed, and if desired, the beveled gear 55 may have a plurality of screw-threaded holes 62 on its periphery so that the screw-threaded tripping element 59 may be disposed therein interchangeably, whereby the trip will engage the star wheel 60 at different times according to the hole in which the trip 59 is placed, and whereby the amount of overload to be registered and indicated may be adjusted.

From the foregoing, it will be understood that the essential feature of the present invention resides in so constructing the compressible members that the fluid therein tends to maintain the members in a predetermined normal shape to support the load and that when the compressible members are compressed under the action of the varying loads, a suitable pressure gage in circuit with the fluid, is actuated for indicating purposes and that the fluid containing, compressible members are also constructed to afford a resilient support for the body independently of the presence of fluid in said members, the fluid, when contained in the compressible members coacting therewith, not only to resiliently support the body and its load, but also to actuate the indicating means. One compressible member may be employed in preference to a plurality of compressible members and it is obvious that whether one or more compressible members be employed that the same may be arranged, other than longitudinally of the vehicle.

What is claimed is:—

1. The combination with a chassis and a vehicle body, of a load indicator comprising fluid operated indicating means and fluid containing, compressible, operating members interposed between the chassis and the body to yieldably support the body on the chassis, and means to adjustably limit the relative yieldable movement of the body and chassis and thereby prevent compression of the compressible members beyond a predetermined point.

2. The combination with a chassis and a vehicle body, of a load indicator comprising a fluid operated indicating means and a fluid containing, compressible, operating member interposed between the chassis and the body to yieldably support the body on the chassis, and devices including adjustably mounted stops adapted to limit the relative movements of the body and chassis and prevent compression of the compressible member beyond a predetermined point.

3. The combination of a vehicle chassis and a body, upper and lower sills interposed between the chassis and the body, the upper sills having laterally directed flanges provided with apertures, the lower sills having laterally directed flanges provided with apertures adapted to aline with the aforesaid apertures, means for securing the upper sills to the body, means for securing the lower sills to the chassis, the upper and lower sills having opposing recesses, a compressible fluid containing member disposed in the recesses, between the upper and lower sills, and indicating means having operative connection with the compressible member, devices connecting the flanges of the upper and lower sills and permitting relative movement thereof, and means adjustably mounted on said devices for engagement with the flanges of one of the sills to limit the degree of compression of the compressible member.

4. The combination of an upper and a lower member, upper and lower sills interposed between said members and connected respectively to the upper and lower members, a compressible fluid containing member interposed between the upper and lower sills, an indicating means having operative connection with the compressible member, devices connecting the upper and lower sills and permitting relative movement of the sills, and means adjustably mounted on said devices and operative with relation to one of the sills to limit the degree of compression of the compressible member.

5. The combination of an upper and a lower member, upper and lower sills interposed between said members and connected respectively to the upper and lower members, a compressible fluid containing member interposed between the upper and lower sills, an indicating means having operative connection with the compressible member, devices connecting the upper and lower sills and permitting relative movement of the sills, and means adjustably mounted on said devices and operative with relation to one of the sills to limit the degree of compression of the compressible member, said compressible member being constructed to yieldably support the upper member in the absence of a load thereon and independently of the presence of fluid in said compressible member.

6. The combination of an upper and a lower member, upper and lower sills interposed between said members and connected respectively to the upper and lower members, a compressible fluid containing member interposed between the upper and lower sills, an indicating means having operative connection with the compressible member, a device connecting the upper and lower sills and permitting relative movement of the sills, and means adjustably mounted on said devices and operative with relation to one of the sills to limit the degree of compression of the compressible member, said compressible member being constructed to yieldably support the upper member in the absence of a load thereon and independently of the presence of fluid in said compressible member, and in the presence of fluid in the latter adapted to yieldably support said upper member in the presence of a load on the latter.

In testimony whereof I affix my signature in the presence of a witness.

FREDERICK J. TROLL.

Witness:
J. H. SIGGERS.